March 28, 1939.  A. F. SPITZGLASS ET AL  2,152,333
RECORDING INSTRUMENT
Filed June 18, 1937   2 Sheets-Sheet 1

INVENTORS.
ALBERT F. SPITZGLASS
BY OTTO T. HANDWERK
McConkey & Booth
ATTORNEYS

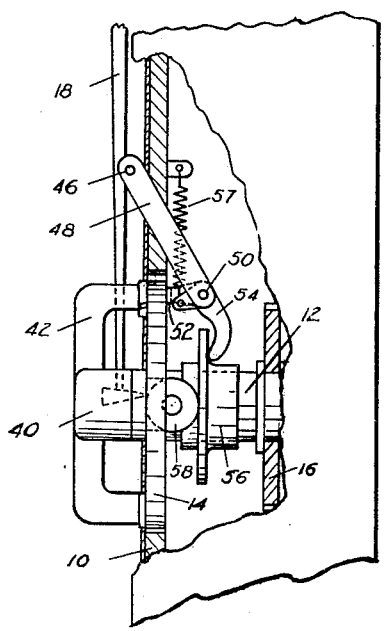
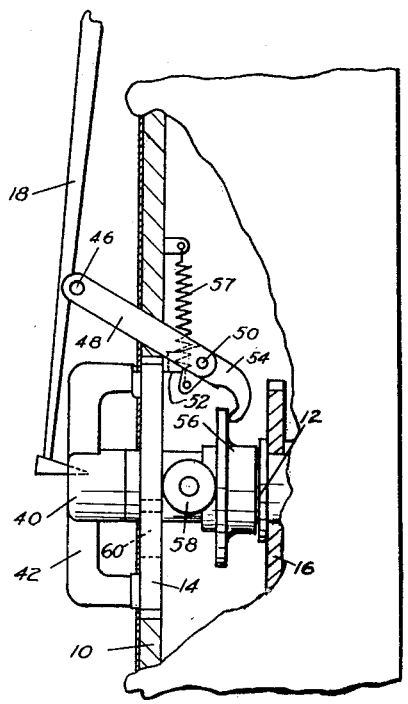
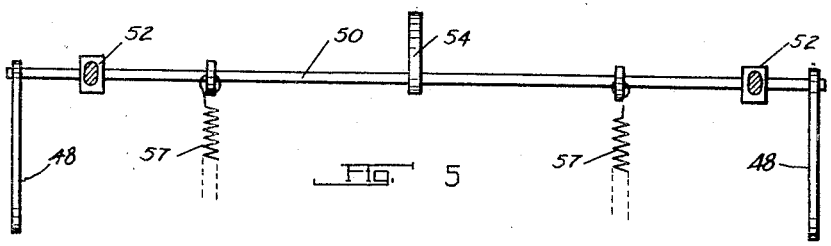
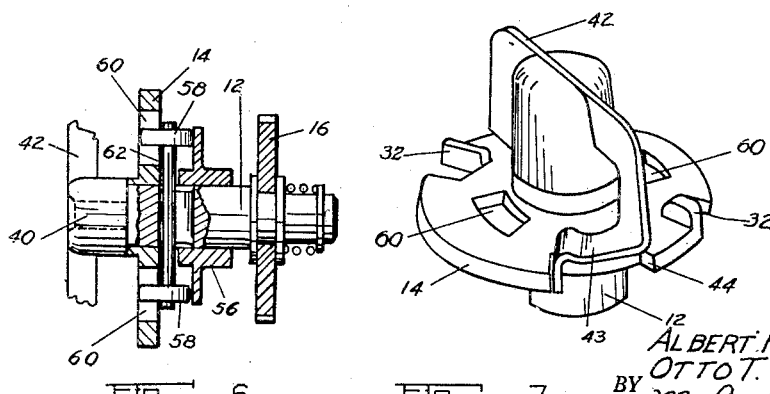

Patented Mar. 28, 1939

2,152,333

UNITED STATES PATENT OFFICE 2,152,333

RECORDING INSTRUMENT

Albert F. Spitzglass and Otto T. Handwerk, Chicago, Ill., assignors to Republic Flow Meters Company, Chicago, Ill., a corporation of Illinois Application June 18, 1937, Serial No. 148,850

14 Claims. (Cl. 234—72)

This invention relates to recording instruments and more particularly to instruments in which a pen automatically draws a curve on a rotating chart.

One of the objects of the invention is to provide novel means for quickly and easily securing a chart to a recording instrument.

Another object of the invention is to provide a recording instrument in which the pen is lifted from the chart when the chart is released.

Another object of the invention is to provide a recording instrument in which the chart is automatically moved to proper timed relationship with the instrument merely by securing it thereto.

Still another object relates to an instrument in which the chart is secured in place by being turned slightly.

Other objects, advantages and novel features of the invention will be apparent from the following description when read in connection with the accompanying drawings, in which:

Figures 3 and 4 are partial sections showing the parts in different positions;

Figure 5 is a detail view of a part of the pen lifter mechanism;

Figure 6 is a partial central section with parts in elevation of the chart-driving post; and Figure 7 is a perspective view of the driving post and chart clamping means.

Figure 1:
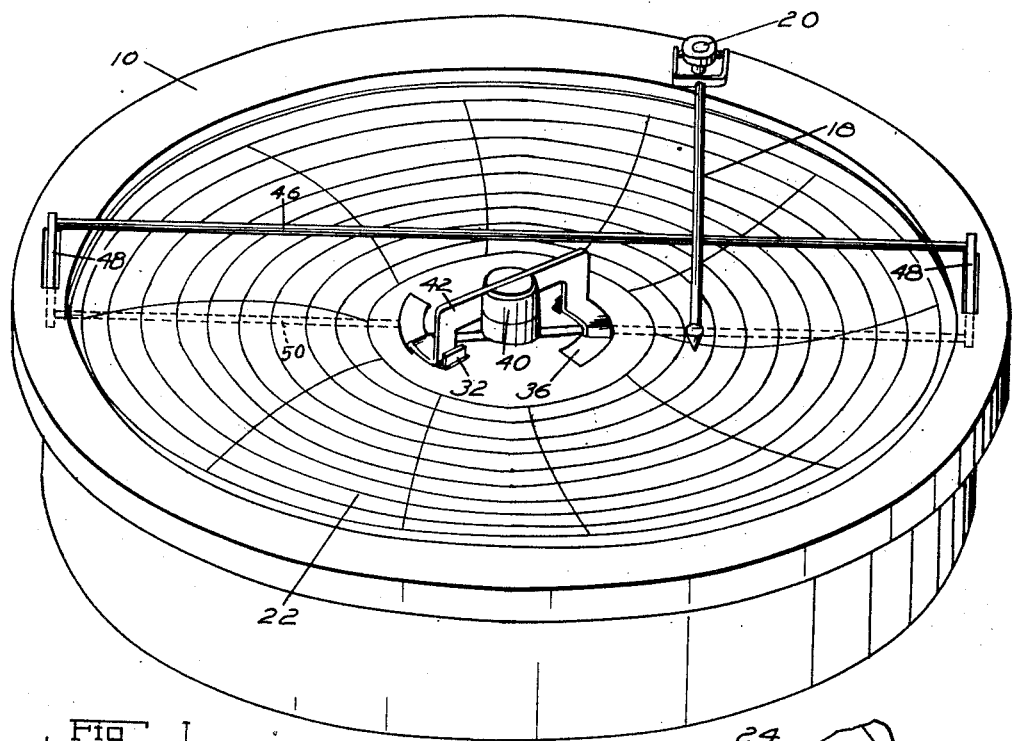
Figure 1 is a perspective view of the face of an instrument embodying the invention.
Figure 2:
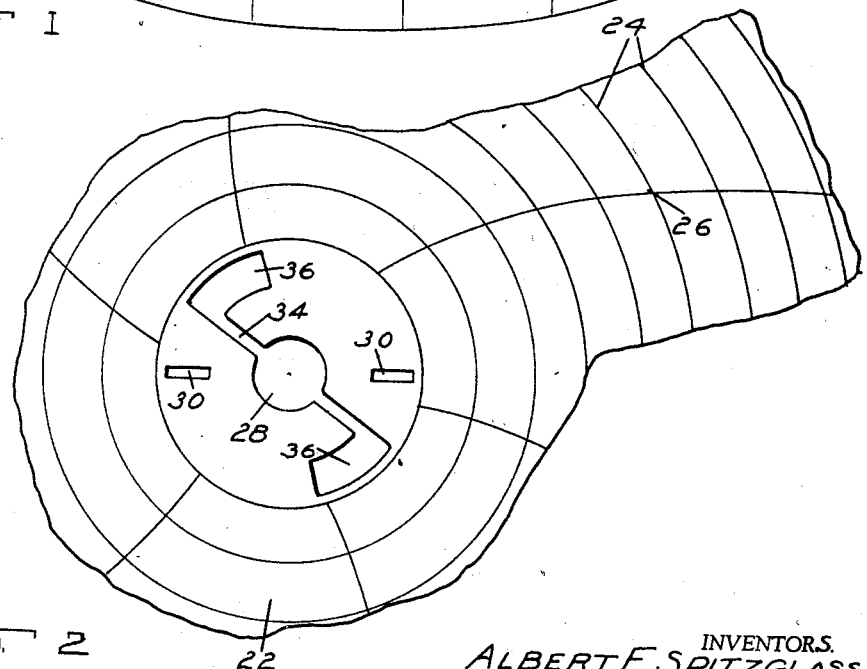
Figure 2 is a partial view of a chart for use with the instrument.

The illustrated instrument includes a panel 10 adapted to support a chart and formed with a central opening through which a chart-driving post 12 projects. The post 12 has rotatably mounted thereon a flange 14 substantially filling the opening in the panel 10 and is yieldingly driven by any suitable clockwork mechanism, the final gear of which is shown at 16. Suitable projections, not shown, may be provided on the post 12 to prevent axial sliding of the flange 14 thereon.

A pen 18 is pivotally mounted on a shaft 20 projecting through the panel 10 adjacent its periphery and outside of the confines of a chart on the instrument. The shaft 20 may be driven by any suitable mechanism responsive to changes in a condition which is to be recorded.

The chart used with the instrument comprises a disc of paper or the like 22 printed on one side with suitable indicia shown as a series of concentric circles 24 graduated in terms of temperature, pressure or other condition to be recorded. Also printed on the chart are a series of arcuate spaced time lines 26 drawn about a center coinciding with the shaft 20 when the chart is on the instrument.

The chart is formed with a central opening 28 to fit over the driving post 12 and with a pair of openings 30 to receive projections 32 formed on the flange 14. An elongated slot 34 passes diametrically through the central opening 28 and connects at its ends to enlarged arcuate slots 36, for a purpose to appear later.

In order to fasten the chart to the instrument a cap member 40 is secured to the driving post 12 and carries strip 42 of suitable spring material which is bent into substantial parallelism with the flange 14 at 43 with its ends extending through notches 44 in the periphery of the flange. The portions 43 are of a size to pass through the openings 36 in the chart as the central portion of strip 42 passes through the slot 34 and are adapted to engage the chart to press it against the flange 14 when out of register with the openings 36.

A pen lifter is provided to raise the pen from the chart when it is desired to remove or replace the chart and as shown comprises a rod 46 extending across the instrument under the pen 18 and secured at its ends to levers 48 extending through slots adjacent the periphery of the panel 10. The levers are secured below the panel to a shaft 50 paralleling the rod 46 and journaled in brackets 52 which are secured to the panel. The shaft 50 carries adjacent its center an arm 54 which engages the lower surface of a flanged collar 56 slidably mounted on the shaft 12, springs 57 being connected to projecting fingers on shaft 50 to rock the shaft in a direction to raise the collar 56.

In order to move the collar 56 and, through it, to operate the pen lifter, a pair of rollers 58 are provided engaging the collar 56 and the lower surface of the flange 14, the flange being formed with a pair of openings 60 to receive the rollers. The rollers are carried by an axle 62 which extends through an axial slot in the shaft 12.

To place a chart on the instrument the flange 14 is turned to the releasing position shown in Figures 4 and 7 with the portions 43 of strip 42 in register with the notches 44. As best seen in Figure 4 the rollers 58 are out of register with the openings 60 and ride on the lower flat surface of the flange to cam the collar 56 down thereby rocking the shaft 50 and raising the rod 46 and the pen 18. A chart may then be placed on the instrument, its slot 34 and openings 36 passing over the strip 42 and portions 43 and its openings 30 receiving the projections 32 on the flange 14. To fasten the chart, it is turned clockwise as seen in Figure 1 until the ends of the strip 42 which extend through the slots 44 engage the ends of the openings 36 and the ends of slots 44, the portions 43 at this time being out of register with the openings 36 and pressing the chart firmly against the flange 14.

As the chart is turned the flange 14 is also turned to the position shown in Figure 3 in which the openings 60 register with the rollers 58. Thus the collar 56 is permitted to move outwardly and the bar 46 and pen 18 are lowered under the influence of springs 57, bringing the pen into marking engagement with the chart.

It will be noted that in the chart engaging position shown in Figures 1 and 3, the chart is held in proper timed relationship on the instrument by the projections 32 and by engagement of the ends of strip 42 with the ends of openings 36 and of notches 44. Thus the present invention insures that the chart is always in proper timed position on the instrument.

To remove the chart it is turned to the releasing position shown in Figures 4 and 7 and may then be lifted freely from the instrument. It will be noted that the only operation necessary either to fasten or to remove a chart is a slight turning of the chart which can be easily and quickly done.

While one embodiment of the invention has been shown and described it will be understood that many changes might be made and it is not intended to limit the scope of the invention to the form shown nor otherwise than by the terms of the appended claims.

What is claimed is:

1. A recording instrument, having a chart-driving central post, chart holding means including a part rotatably carried by said post and rotatable into a chart holding position or a chart releasing position, means on said part engageable with a chart to prevent relative rotation thereof, a pen for making a record on the chart, a pen lifter and means operated by rotation of said chart and said part on the post for raising said pen lifter when the chart holding means is in its chart releasing position and for lowering said pen lifter when the chart holding means is in its chart holding position.

2. A recording instrument having a chart-supporting panel with a central post projecting therethrough, chart holding means including a part movably carried by the post, a pen on one side of the panel for making a record on the chart, a pen lifter including a pen engaging member on said side of the panel and operating parts on the other side of the panel, and means carried by said post and operated by movement of said chart holding part on the post for cooperating with said parts to operate the pen lifter, said means lying on the side of the panel opposite said pen.

3. A recording instrument having a chart-driving central post, chart holding means including a part rotatably carried by said post, a pen for making a record on the chart, a pen lifter, means slidably carried by said post for operating said pen lifter and means operated by rotation of said part on the post and connected to said last named means to slide said last named means on the post thereby to operate the pen lifter.

4. A recording instrument comprising a chart-driving central post, a flange rotatably mounted on said post to support a chart, means on said flange engaging the chart to prevent the chart from rotating relatively thereto, chart clamping means carried by said post and cooperating with said flange to clamp a chart thereon, a pen for making a record on the chart, a pen lifter, and means operated by rotation of said flange on the post for operating said pen lifter.

5. A recording instrument comprising a chart-driving central post, a flange on said post to support a chart, means on said flange engaging the chart to prevent the chart from rotating thereon, chart clamping means carried by said post and cooperating with said flange to clamp a chart thereon, a pen for making a record on the chart, a pen lifter, and a member operatively connected to said post and to said pen lifter, said member and flange being formed with cooperating cam surfaces to operate the pen lifter.

6. A recording instrument comprising a chart-driving central post, a flange rotatably mounted on said post to support the central part of a chart, means on the flange engaging the chart to prevent rotation of the chart thereon, and chart clamping means including a cap mounted on the post and a spring strip carried by the cap, said strip having angular portions adapted to register with openings in a chart when the cap is in one angular position relatively to the flange and to be moved out of register with said openings to press the chart against the flange when the cap is in another angular position.

7. A recording instrument comprising a chart-driving central post, means carried by said post for rotatably supporting a chart thereon, and chart clamping means carried by the post and including portions adapted to register with openings in a chart when the chart is in one position and to be moved out of register with the openings when the chart is turned, a pen for making a record on the chart, a pen lifter, and means operated by turning of the chart for operating the pen lifter to lift the pen when the chart is in said one position and to lower the pen when the chart is turned.

8. A recording instrument comprising a chart-driving central post, means carried by said post for rotatably supporting a chart thereon, and chart clamping means carried by the post and including portions adapted to register with openings in a chart when the chart is in one position and to be moved out of register with the openings when the chart is turned, a pen for making a record on the chart, a pen lifter, and means including a cam member connected to said clamping means and cooperating with a cam portion on said first named means to operate the pen lifter.

9. A recording instrument comprising a chart-driving central post, a flange on said post to support the central part of a chart, means on the flange engaging the chart to prevent rotation of the chart thereon, and chart clamping means carried by said post and including resilient members adapted to register with openings in a chart in one angular position and to move out of register with the openings to press the chart against said flange in another angular position, a pen for making a record on the chart, a pen lifter, and means including a cam member cooperating with a cam surface on the flange for operating the pen lifter.

10. A recording instrument comprising a chart-driving central post, a flange on said post to support the central part of a chart, means on the flange engaging the chart to prevent rotation of the chart thereon, and chart clamping means carried by said post and including resilient members adapted to register with openings in a chart when the chart is in one angular position relative to the clamping means and to move out of register with the openings to press the chart against said flange when the chart is in another angular position, a pen for making a record on the chart, a pen lifter, and means including a roller adapted to move into and out of an opening in the flange as the chart and flange are turned for operating the pen lifter.

11. A recording instrument comprising a chart-driving central post, a flange rotatably mounted on said post to support the central part of a chart, means on said flange engaging the chart to prevent rotation of the chart thereon, said flange being formed with cam openings, chart clamping means carried by the post and including a resilient member adapted to pass through an opening in the chart and to move out of register with said opening to press the chart against the flange when the chart and flange are turned, a pen, a pen lifter, an axle slidably carried by the post and carrying a pair of rollers adapted to move into and out of said cam openings as the flange is turned, and means operated by said rollers to operate the pen lifter.

12. A recording instrument comprising a chart driving post, a flange rotatably mounted on said post to support the central part of a chart, means on said flange engaging the chart to prevent rotation of the chart thereon whereby the chart and flange will turn together on the post, a pen, a pen lifter, and means operated by rotation of the chart and flange to operate the pen lifter.

13. A recording instrument comprising a chart driving post, a flange rotatably mounted on said post to support the central part of a chart, means on said flange engaging the chart to prevent rotation of the chart thereon whereby the chart and flange will turn together on the post and chart clamping means carried by the post and including a resilient member adapted to pass through an opening in the chart and to move out of register with said opening as the chart and flange are turned, a pen lifter and means operated by turning of said flange to operate the pen lifter.

14. A recording instrument comprising a chart driving post rotatably to receive a chart, chart clamping means fixedly carried by said post and including a substantially horizontal resilient portion terminating in a down-turned end, said portion adapted to pass through an opening in a chart and said end engaging the edge of the opening to limit turning movement of the chart on the post.

ALBERT F. SPITZGLASS.
OTTO T. HANDWERK.